United States Patent
Liu et al.

(10) Patent No.: US 11,946,476 B2
(45) Date of Patent: Apr. 2, 2024

(54) COMPRESSOR ROTOR, COMPRESSOR AND REFRIGERANT CIRCULATION SYSTEM

(71) Applicant: Gree Electric Appliances, Inc. of Zhuhai, Guangdong (CN)

(72) Inventors: Hua Liu, Guangdong (CN); Zhiping Zhang, Guangdong (CN); Yuhui Chen, Guangdong (CN); Ruixing Zhong, Guangdong (CN); Hongbo Li, Guangdong (CN); Wenteng Ye, Guangdong (CN); Jingli Qi, Guangdong (CN)

(73) Assignee: Gree Electric Appliances, Inc. of Zhuhai, Guangdong (CN)

(*) Notice: Subject to any disclaimer, the term of this patent is extended or adjusted under 35 U.S.C. 154(b) by 385 days.

(21) Appl. No.: 17/288,210

(22) PCT Filed: Oct. 23, 2019

(86) PCT No.: PCT/CN2019/112789
§ 371 (c)(1),
(2) Date: Apr. 23, 2021

(87) PCT Pub. No.: WO2020/134424
PCT Pub. Date: Jul. 2, 2020

(65) Prior Publication Data
US 2021/0404475 A1    Dec. 30, 2021

(30) Foreign Application Priority Data
Dec. 25, 2018 (CN) .......................... 201811595102.7

(51) Int. Cl.
*F04D 25/06* (2006.01)
*F04D 17/10* (2006.01)
(Continued)

(52) U.S. Cl.
CPC .............. *F04D 25/06* (2013.01); *F04D 17/10* (2013.01); *F04D 29/284* (2013.01);
(Continued)

(58) Field of Classification Search
CPC ........ F04D 25/06; F04D 17/10; F04D 29/284; F04D 25/0606; F04D 29/053;
(Continued)

(56) References Cited

U.S. PATENT DOCUMENTS

| | | | |
|---|---|---|---|
| 6,997,686 B2* | 2/2006 | Agrawal | F04D 25/0606 417/370 |
| 10,578,117 B2* | 3/2020 | Barthes | F04D 25/024 |

(Continued)

FOREIGN PATENT DOCUMENTS

| | | |
|---|---|---|
| CN | 105889096 A | 8/2016 |
| CN | 206471938 U | 9/2017 |

(Continued)

OTHER PUBLICATIONS

HZMR, HZMR Multistage Centrifugal Pumps, Jul. 3, 2016 (Year: 2016).*

Primary Examiner — Dominick L Plakkoottam
(74) Attorney, Agent, or Firm — The Webb Law Firm

(57) ABSTRACT

The present disclosure provides a compressor rotor, a compressor and a refrigerant circulation system. The compressor rotor includes: a motor rotor including a plurality of rotor sections, a locking rod, a compression unit rotating part and a locking member. The rotor sections are fixedly connected in an axial direction and are provided with an axial through hole and the locking rod penetrates through the axial through hole. The compression unit rotating part is located at the end part of the motor rotor and is connected to the locking rod. The locking member is configured to lock the compression unit rotating part on the locking rod. The locking rod, the (Continued)

compression unit rotating part and the locking member form a pressing structure which applies a pressure toward an axial inner side to the motor rotor.

12 Claims, 1 Drawing Sheet

(51) Int. Cl.
*F04D 29/28* (2006.01)
*H02K 1/27* (2022.01)
*H02K 1/2706* (2022.01)
*H02K 1/28* (2006.01)
*H02K 7/14* (2006.01)
*F25B 31/02* (2006.01)

(52) U.S. Cl.
CPC .............. *H02K 1/2706* (2013.01); *H02K 1/28* (2013.01); *H02K 7/14* (2013.01); *F25B 31/026* (2013.01)

(58) Field of Classification Search
CPC ...... F04D 29/266; H02K 1/2706; H02K 1/28; H02K 7/14; H02K 7/003; H02K 1/30; H02K 2213/03; H02K 1/22; F25B 31/026; F25B 1/053; F25B 1/10; F25B 41/00; F05D 2240/61; F05D 2260/31
See application file for complete search history.

(56) References Cited

U.S. PATENT DOCUMENTS

| | | | |
|---|---|---|---|
| 2004/0005228 A1* | 1/2004 | Agrawal | ............... F04D 29/053 |
| | | | 417/423.12 |
| 2021/0172458 A1* | 6/2021 | Oh | ........................... F04D 17/10 |

FOREIGN PATENT DOCUMENTS

| | | | | |
|---|---|---|---|---|
| CN | 108591084 A | 9/2018 | | |
| CN | 208028677 U | 10/2018 | | |
| CN | 209344880 U | 9/2019 | | |
| EP | 2375547 B1 | 8/2014 | | |
| EP | 3261223 A2 * | 12/2017 | ........... | H02K 1/2726 |
| JP | 2011202588 A | 10/2011 | | |

* cited by examiner

COMPRESSOR ROTOR, COMPRESSOR AND REFRIGERANT CIRCULATION SYSTEM

CROSS-REFERENCE TO RELATED APPLICATIONS

This application is the United States national phase of International Application No. PCT/CN2019/112789 filed Oct. 23, 2019, and claims priority to Chinese Patent Application No. 201811595102.7, filed on Dec. 25, 2018 and entitled "COMPRESSOR ROTOR, COMPRESSOR AND REFRIGERANT CIRCULATION SYSTEM", the disclosures of which are hereby incorporated to the present application in their entirety.

BACKGROUND OF THE INVENTION

Field of the Invention

The present disclosure relates to the technical field of compressors and refrigeration, in particular to a compressor rotor, a compressor and a refrigerant circulation system.

Description of Related Art

In a compressor, especially a high-speed compressor such as a centrifugal compressor, a compressor rotor thereof rotates at high speed during running. Therefore, a reliable bearing is required to support the compressor rotor. Generally, a rotor of a compressor adopts a rolling bearing or an oil film bearing. As a rolling bearing and an oil film bearing have a relatively high bearing capacity, a compressor generally adopts a motor rotor which is of an integrated structure. This integrated compressor rotor is relatively heavy, resulting in a disadvantage in improvement of a critical rotating speed of the rotor. When manufacturing a larger compressor rotor, a machining process of an integrated motor rotor is relatively complicated and has relatively high requirements on equipment. Therefore, the cost is increased. When a fluid system, such as a compressor in a refrigerant circulation system, adopts a rolling bearing or an oil film bearing, an additional oil lubrication system and a complicated oil supply line system are required, and the refrigerant circulation system requires an oil separation system. Therefore, the refrigerant circulation system is complicated and large.

SUMMARY OF THE INVENTION

The present disclosure is intended to provide a compressor rotor, a compressor and a refrigerant circulation system.

A first aspect of the present disclosure provides a compressor rotor which includes:
- a motor rotor, wherein the motor rotor includes a plurality of rotor sections fixedly connected in an axial direction, and the plurality of rotor sections are provided with an axial through hole;
- a locking rod penetrating through the axial through hole;
- a compression unit rotating part located at the end part of the motor rotor and connected to the locking rod; and
- a locking member configured to lock the compression unit rotating part on the locking rod, wherein the locking rod, the compression unit rotating part and the locking member form a pressing structure which applies a pressure toward an axial inner side to the motor rotor.

In some embodiments, the compression unit rotating part and the locking member are respectively arranged at the two ends of the locking rod.

In some embodiments,
the end part of the locking rod is provided with an external thread; and
the locking member includes a locknut engaged with the external thread.

In some embodiments, the axial through hole includes:
a small-diameter section; and
a large-diameter sections which has a larger diameter than the small-diameter section.

In some embodiments, the locking rod includes:
a rod body being in clearance fit with the small-diameter section; and
a protrusion part arranged on the rod body and protruding radially outwards from the rod body, wherein the protrusion part is in clearance fit with the large-diameter section.

In some embodiments, the protrusion part is a protruding ring.

In some embodiments,
an axial middle part of the motor rotor includes a permanent magnet, the small-diameter section is located at an axial middle part of the axial through hole, and the two large-diameter sections are respectively located at the two ends of the axial through hole; and
the locking rod includes two protrusion parts which are respectively fitted with the two large-diameter sections.

In some embodiments,
one of the two protrusion parts is a fixed protrusion part fixed to the rod body, and the other one is a movable protrusion part that is movable relative to the rod body; or,
the two protrusion parts are both movable relative to the rod body.

In some embodiments, the movable protrusion part is engaged with the inner wall of the axial through hole through a key to limit the circumferential position of this movable protrusion part.

In some embodiments, the rod body is provided with a shaft shoulder; and the movable protrusion part is arranged between the surface of one end of the motor rotor and the shaft shoulder.

In some embodiments, the compression unit rotating part at one end of the motor rotor where the movable protrusion part is arranged includes an axial lug boss; the axial lug boss extends into the axial through hole; and the movable protrusion part is axially arranged between the shaft shoulder and an end face of the axial lug boss.

In some embodiments, a fitting clearance between the fixed protrusion part and the corresponding large-diameter section is smaller than that between the rod body and the small-diameter section.

In some embodiments,
the movable protrusion part is in interference fit with the corresponding large-diameter section; and/or,
the movable protrusion part is in clearance fit with the rod body.

In some embodiments, the plurality of rotor sections include:
a permanent magnet;
a first end shaft section fixedly arranged at one end of the permanent magnet; and
a second end shaft section fixedly arranged at the other end of the permanent magnet.

In some embodiments, the compression unit rotating part includes a centrifugal impeller.

A second aspect of the present disclosure provides a compressor including the compressor rotor of the first aspect of the present disclosure.

In some embodiments, the compressor includes a gas bearing, and the compressor rotor is supported on the gas bearing.

A third aspect of the present disclosure provides a refrigerant circulation system including the compressor of the second aspect of the present disclosure.

Based on the compressor rotor provided by the present disclosure, a motor rotor thereof includes a plurality of rotor sections fixedly connected in the axial direction. A locking rod penetrates into the motor rotor. The locking rod, the compression unit rotating part and a locking member form a pressing structure which applies a pressure toward an axial inner side to the motor rotor. In this way, when the motor rotor with a plurality of rotor sections are machined in sections, they are connected more reliably and firmly.

The compressor and the refrigerant circulation system provided by the present disclosure have the advantages of the compressor rotor provided by the present disclosure.

Other features and advantages of the present disclosure will be described clearly by the following detailed description of exemplary embodiments of the present disclosure with reference to the following drawings.

BRIEF DESCRIPTION OF THE DRAWINGS

The drawings described herein are used to provide a further understanding of the present disclosure and constitute a part of the present application. The exemplary embodiments of the present disclosure and the descriptions thereof are used to explain the present disclosure, and do not constitute an improper limitation to the present disclosure. In the drawings.

DETAILED DESCRIPTION OF THE INVENTION

Figure 1:
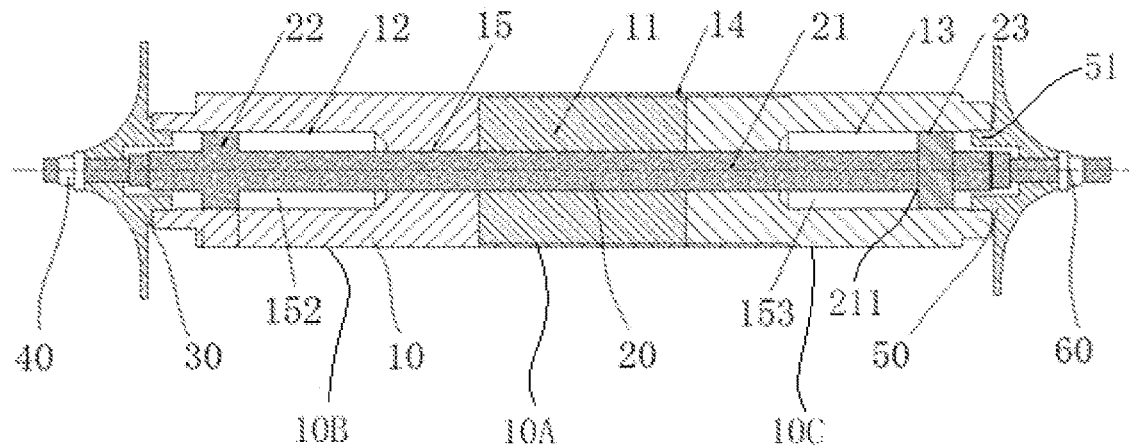
FIG. 1 is a schematic diagram of a structure of a compressor rotor of one embodiment of the present disclosure.

Technical solutions of embodiments of the present disclosure will be clearly and completely described below in conjunction with the drawings of the embodiments of the present disclosure. Apparently, the described embodiments are merely some rather than all embodiments of the present disclosure. The following description of at least one exemplary embodiment is actually only illustrative, and in no way serves as any limitation to the present disclosure and its application or use. Based on the embodiments of the present disclosure, all other embodiments obtained by those of ordinary skill in the art without creative work are included in the protection scope of the present disclosure.

Unless otherwise specified, relative arrangement of components and steps, numerical expressions and numerical values described in these embodiments do not limit the scope of the present disclosure. Also, it should be understood that, for convenience in description, the size of each part illustrated in the drawings is not drawn according to an actual proportional relationship. The technologies, methods, and equipment known to those of ordinary skill in the relevant arts may not be discussed in detail, but where appropriate, these technologies, methods and equipment should be regarded as part of the authorization specification. In all examples illustrated and discussed herein, any specific value should be interpreted as merely exemplary rather than a limitation. Therefore, other examples of exemplary embodiments may have different values. It should be noted that similar reference numerals and letters indicate similar items in the following drawings, therefore once a certain item is defined in one drawing, it does not need to be further discussed in subsequent drawings.

In the description of the present disclosure, it should be understood that the use of terms such as "first" and "second" to define parts is merely for conveniently distinguishing the corresponding parts. Unless otherwise stated, the above terms have no special meanings. Therefore, these items cannot be understood as a limitation to the protection scope of the present disclosure.

In the description of the present disclosure, it should be understood that the various orientation words such as "front, back, up, down, left, right", "transverse, vertical, perpendicular, horizontal", "top, bottom" and the like are merely for conveniently describing the present disclosure and simplifying the description; unless there is opposite description, these orientation words do not indicate or imply that the device or element must have a specific orientation or be constructed and operated in a specific orientation, and therefore cannot be understood as a limitation to the protection scope of the present disclosure; and the orientation words "inside and outside" refer to inside and outside relative to the contour of each member itself.

Figure 2:
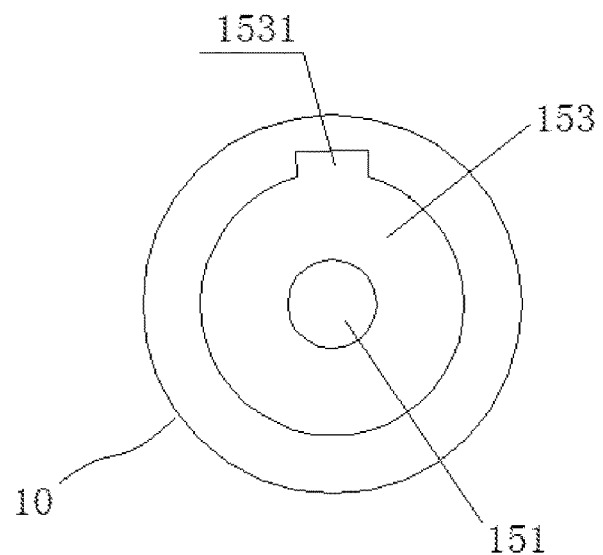
FIG. 2 is a schematic cross-sectional diagram of a structure of a motor rotor of a compressor rotor of the embodiment shown in FIG. 1.
Figure 3:
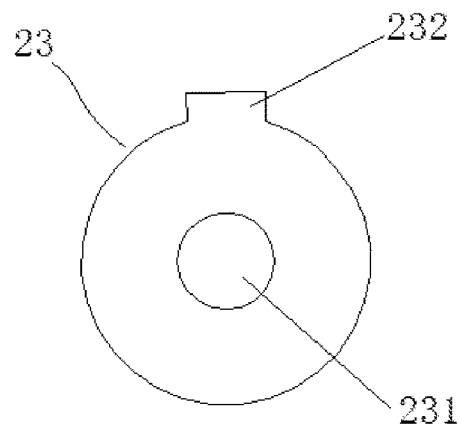
FIG. 3 is a schematic diagram of a structure of a movable protrusion part of a locking rod of a compressor rotor of the embodiment shown in FIG. 1.

As shown in FIG. 1 to FIG. 3, an embodiment of the present disclosure provides a compressor rotor. The compressor rotor includes a motor rotor 10, a locking rod 20, a compression unit rotating part and a locking member.

As shown in FIG. 1, the motor rotor 10 includes a plurality of rotor sections 10A, 10B, 10C fixedly connected in an axial direction, wherein the plurality of rotor sections 10A, 10B, 10C are provided with an axial through hole 15. The locking rod 20 penetrates through the axial through hole 15. The compression unit rotating part is located at the end part of the motor rotor 10 and connected to the locking rod 20. The locking member is configured to lock the compression unit rotating part on the locking rod 20. The locking rod, the compression unit rotating part and the locking member form a pressing structure which applies a pressure toward an axial inner side to the motor rotor 10.

In the compressor rotor of the present disclosure, the motor rotor 10 includes a plurality of rotor sections 10A, 10B, 10C fixedly connected in the axial direction; the locking rod 20 penetrates into the motor rotor 10; and the locking rod, the compression unit rotating part and the locking member form a pressing structure which applies a pressure toward an axial inner side to the motor rotor 10. In this way, when the motor rotor 10 with a plurality of rotor sections 10A, 10B, 10C is machined in sections, the rotor sections of the motor rotor 10 are connected more reliably and firmly.

As shown in FIG. 1, in some embodiments, the compressor may be a centrifugal compressor which uses the compression unit rotating part including a centrifugal impeller. Optionally, only one side of the motor rotor is provided with a compression unit rotating part, or the two sides of the motor rotor are each provided with a compression unit rotating part. The compression unit rotating part at each side may be a single-stage one or a multi-stage one. For example, if the compression unit rotating part includes an impeller, there may include one, two or more than two impellers at one side of the motor rotor.

In some embodiments, the two ends of the locking rod 20 are each connected with a compression unit rotating part.

In some embodiments, the end part of the locking rod 20 is provided with an external thread, and the locking member includes a locknut engaged with the external thread of the locking rod 20.

As shown in FIG. 1, in some embodiments, the compressor rotor includes a motor rotor 10, a first-stage centrifugal impeller 30 and a second-stage centrifugal impeller 50. The left and right ends of the locking rod 20 are each provided with an external thread. The first-stage centrifugal impeller 30 is locked at the left end of the locking rod 20 by a first locknut 40 serving as a locking member. The second-stage centrifugal impeller 50 is locked at the right end of the locking rod 20 by a second locknut 60 serving as a locking member.

As shown in FIG. 1 and FIG. 2, in some embodiments, the axial through hole 15 includes a small-diameter section 151 and large-diameter sections which have a larger diameter than the small-diameter section 151.

The axial through hole 15 includes a small-diameter section 151 and a large-diameter section which has a larger diameter than the small-diameter section 151. The motor rotor can be made into a hollow structure as much as possible according to the properties of each rotor section of the motor rotor 10, thereby helping to lower the weight of the motor rotor 10 and the compressor rotor and increase a critical rotating speed of the compressor rotor.

In some embodiments, the locking rod 20 includes a rod body 21 and a protrusion part. The rod body 21 is fitted with the small-diameter section 151 of the axial through hole 15. The protrusion part is arranged on the rod body 21, protrudes radially outwards from the rod body 21 and is fitted with the large-diameter section of the axial through hole 15.

By arranging the protrusion part, the overall rigidity of the locking rod 20 can be improved without greatly increasing the overall weight of the compressor rotor, thereby facilitating dynamic balance of the compressor rotor.

In some embodiments, each protrusion part is a protruding ring. Each protruding ring can support each circumferential position of the rod body 21 to facilitate dynamic balance of the compressor rotor.

In some embodiments, an axial middle part of the motor rotor 10 includes a permanent magnet 11; the small-diameter section 151 is located at an axial middle part of the axial through hole 15; and two large-diameter sections are respectively arranged at the two ends of the axial through hole 15. As shown in FIG. 1 and FIG. 2, the two large-diameter sections are respectively a first large-diameter section 152 at the left end of the motor rotor and a second large-diameter section 153 at the right end of the motor rotor 10.

For a motor rotor 10 with a plurality of rotor sections 10A, 10B, 10C, the axial middle part is generally a position for arranging the permanent magnet. By arranging the small-diameter section at the axial middle part, influences on the permanent magnet caused by arranging the axial through hole can be reduced. The two axial ends of the motor rotor 10 are non-magnetic bodies where the large-diameter sections are arranged, which helps to lower the overall weight of the motor rotor and the compressor rotor so as to increase a critical rotating speed of the compressor rotor.

As shown in FIG. 1, the locking rod 20 includes two protrusion parts which are correspondingly fitted with the two large-diameter sections. By arranging the protrusion parts in this way, the overall rigidity of the locking rod 20 can be improved to facilitate dynamic balance of the compressor rotor.

As shown in FIG. 1, one of the two protrusion parts is a fixed protrusion part 22 fixed to the rod body 21, and the other one is a movable protrusion part which is movable relative to the rod body 21. The fixed protrusion part 22 and the movable protrusion part 23 are respectively configured to facilitate assembly of the locking rod 20 and the motor rotor 10.

In the embodiment shown in FIG. 1, the fixed protrusion part 22 is fitted with the first large-diameter section 152, and the movable protrusion part 23 is fitted with the second large-diameter section 153.

In some unillustrated embodiments, the two protrusion parts may both be movable protrusion parts which are movable relative to the rod body.

In some embodiments, the movable protrusion part 23 is fitted with the inner wall of the axial through hole 15 through a key to limit a circumferential position of the movable protrusion part 23 relative to the axial through hole 15.

As shown in FIG. 1 to FIG. 3, a key slot 1531 is formed in a hole wall of the second large-diameter section 153, and a key 232 is arranged at the periphery of the movable protrusion part 23. When a central hole 231 of the movable protrusion part 23 is arranged between the rod body 21 penetrating through the axial through hole 15 of the motor rotor 10 and the inner wall of the second large-diameter section 153 in a sleeving way, the key 232 is fitted with the key slot 1531 to limit the circumferential position of the movable protrusion part 23.

FIG. 1 to FIG. 3 merely illustrate the form of a square key. In an unillustrated embodiment, the key may be fixed to the motor rotor and the slot may be formed in the movable protrusion part; the key may be independent, and key slots may be respectively formed in the motor rotor 10 and the movable protrusion part. The key may be a square key, or a round key, a half-round key, a spline, etc.

As shown in FIG. 1, in some embodiments, the rod body 21 is provided with a shaft shoulder 211, and the movable protrusion part 23 is arranged between the surface of one end of the motor rotor 10 and the shaft shoulder 211. For example, the movable protrusion part 23 may abut against the shaft shoulder 211. In this way, an axial position of the movable protrusion part 23 is limited, and stable rigidity of the locking rod 20 is guaranteed.

In some embodiments, the compression unit rotating part at one end of the motor rotor 10 where is movable protrusion part 23 is arranged includes an axial lug boss 51 extending into the axial through hole 15, and the movable protrusion part 23 is axially limited between the shaft shoulder 211 and the end face of the axial lug boss 51.

As shown in FIG. 1, the left end of the second centrifugal impeller 50 is provided with an axial lug boss 51; the outer circumference of the axial lug boss 51 is fitted with the inner wall of the right end of the second large-diameter section 153; and the axial position of the movable protrusion part 23 can be limited within a certain range by the left end face of the axial lug boss 51 and the shaft shoulder 211 on the rod body 21. When the distance between the left end face of the axial lug boss 51 and the shaft shoulder 211 is set to be equal to or a little larger than the distance between the two axial ends of the movable protrusion part 23, the axial position of the movable protrusion part 23 is basically determined, which helps to guarantee stable rigidity of the locking rod 20, and in this way dynamic balance of the compressor rotor is guaranteed.

In some embodiments, a fitting clearance between the fixed protrusion part 22 and the corresponding large-diameter section is smaller than that between the rod body 21 and the small-diameter section 151. In this way, the compressor rotor can be rapidly assembled.

In some embodiments, the movable protrusion part 23 is in interference fit with the corresponding large-diameter section and in clearance fit with the rod body 21. In this way, the compressor rotor can be rapidly assembled.

As shown in FIG. 1, in some embodiments, the plurality of rotor sections 10A, 10B, 10C of the motor rotor 10 include a permanent magnet n, a first end shaft section 12 and a second end shaft section 13. The first end shaft section 12 is fixedly arranged at one end of the permanent magnet 11. The second end shaft section 13 is fixedly arranged at the other end of the permanent magnet 11.

The permanent magnet 11 may be a hollow cylinder with an axial through hole. The permanent magnet 11 serves as the motor rotor 10 and a motor stator of the compressor to together form a motor for driving the compressor rotor to rotate. The permanent magnet 11 may be, for example, made from magnetic steel.

As shown in FIG. 1, in some embodiments, the motor rotor 10 further includes a mounting sleeve 14, wherein the mounting sleeve 14 is integrally arranged at one end, close to the permanent magnet 11, of the first end shaft section 12. The permanent magnet 11 and the second end shaft section 13 are fixedly installed in the mounting sleeve 14 in a thermal sleeving way.

In some unillustrated embodiments, an independent mounting sleeve may be provided, and the first end shaft section, the permanent magnet and the second end shaft section are all arranged in the mounting sleeve in a thermal sleeving way.

Some embodiments of the present disclosure will be described below in more detail with reference to FIG. 1 to FIG. 3.

As shown in FIG. 1 to FIG. 3, the motor rotor 10 of the compressor rotor of one embodiment of the present disclosure includes a permanent magnet n, a first end shaft section 12, a second end shaft section 13 and a mounting sleeve 14. The left end of the mounting sleeve 14 and the right end of the first end shaft section 12 are integrally arranged. The first end shaft section 12, the second end shaft section 13 and the permanent magnet 11 are each machined into a hollow structure with an axial through hole. The second end shaft section 13 and the first end shaft section 12 are similar in structure and are symmetrically arranged; the peripheral surface of the left end of the second end shaft section 13 is in a step form, so that the motor rotor 10 is equal in peripheral diameter after three rotor sections are connected.

Each rotor section is machined independently to ensure a reasonable accuracy, and is subsequently assembled to form the motor rotor 10. During an assembly process of the motor rotor 10, the permanent magnet 11 and the second end shaft section 13 are first glued and fixed together. Subsequently, the first end shaft section 12 and the mounting sleeve 14 are heated to a relatively high temperature such as 700 to 900 DEG C., and then the permanent magnet 11 and the second end shaft section 13 are quickly sleeved in the mounting sleeve 14. In this way, the time for thermal sleeving type interference fitting can be shortened and the success rate of assembly can be increased. Since the motor rotor 10 is subjected to a centrifugal force during high-speed rotation, material expansion occurs. Therefore, the magnitude of interference should be a little larger to prevent loosening of parts after the magnitude of interference is reduced.

Since the three rotor sections are all hollow structures, gases generated during thermal sleeving can be exhausted from the axial through hole 15 without additionally forming vents. Therefore, machining is facilitated, and the production efficiency of the motor rotor 10 is improved.

The diameter of the axial through hole inside the permanent magnet 11 is approximately the same as that of the corresponding rod section of the rod body 21 of the locking rod 20. Considering the properties of a permanent magnetic material, the diameter of the axial through hole inside the permanent magnet 11 may be ¼ to ⅓ of the outer diameter of the permanent magnet. As shown in FIG. 1, the axial through hole inside the permanent magnet 11 constitutes a part of hole section of the small-diameter section 151 of the axial through hole 15 of the motor rotor 10.

The axial through hole inside the permanent magnet 11 is in clearance fit with the corresponding rod section of the rod body 21, and the fitting clearance, for example, may be 0.03 mm to 0.05 mm. The roughness of the surface, in contact with the rod body 21, of the axial through hole may be 0.8 nm to 1.6 nm to prevent influences of a surface peak on assembly.

Since the wall of the mounting sleeve is relatively thin, there will be certain strength problems after interference fitting. A locking rod 20 can be arranged at the radial middle of the motor rotor 20 to improve the reliability of fitting.

The locking rod 20 is relatively long, which will affect its rigidity and strength. Therefore, a fixed protrusion part 22 in a form of a supporting and positioning step is machined at the left end of the locking rod to increase the rigidity, so as to lower the flexibility of the locking rod 20. The fixed protrusion part 22 is in clearance fit with the first large-diameter section 152. The fitting clearance between the fixed protrusion part 22 and the first large-diameter section 152 may be smaller than that between the permanent magnet 11 and the corresponding rod section 21 of the locking rod 20. The fitting clearance between the fixed protrusion part 22 and the first large-diameter section 152 may be, for example, 0.01 mm to 0.03 mm.

The right end of the locking rod 20 is radially positioned by the movable protrusion part 23. The central hole 231 of the movable protrusion part 23 is in clearance fit with the corresponding rod section 21 of the locking rod 20. Wherein, the movable protrusion 23 is in small interference fit with the inner wall of the second large-diameter section 153 in the second end shaft section 13 to radially position the right end of the locking rod 20.

As shown in FIG. 2 and FIG. 3, the movable protrusion part 23 is circumferentially positioned through engaging of a key 232 fixedly arranged on the movable protrusion part 23 and a key slot 1531 formed in the inner wall of the second large-diameter section 153.

The second large-diameter section 153 is in interference fit with the movable protrusion part 23, the second large-diameter section 153 has a negative deviation in diameter, the movable protrusion part 23 has a positive deviation in outer diameter, and the total magnitude of interference may be 0.01 mm to 0.02 mm.

When the motor rotor 10 is assembled with the locking rod 20 and the centrifugal impellers, the movable protrusion part 23 and the motor rotor 10 adopt cold assembly. First, the movable protrusion part 23 is installed leftwards along the key slot 1531; subsequently, at the left end of the motor rotor 10, the rod body 21 of the locking rod 20 is inserted into the axial through hole 50 of the motor rotor 10; afterwards, the first-stage centrifugal impeller 30 and the second-stage centrifugal impeller 50 are respectively installed at the left and right ends of the rod body 21; and at last, the first-stage centrifugal impeller 30 and the second-stage centrifugal impeller 50 respectively abut against the left and right ends of the motor rotor 50 in a pressing manner by means of reverse tightening through a first locknut 40 and a second locknut 60. After assembly is completed, the locking rod 20, the first-stage centrifugal impeller 30, the second-stage centrifugal impeller 50, the first locknut 40 and the second locknut 60 form a pressing structure to apply a pressure toward an axial inner side to the motor rotor 10, and thus the rotor sections of the motor rotor 10 are connected more firmly and stably.

The two end shaft sections are respectively installed at the two axial ends of the permanent magnet 11, and the two axial end faces of the motor rotor are each equipped with a centrifugal impeller, which can effectively prevent the problem that the motor rotor is extremely long when the first-stage centrifugal impeller and the second-stage centrifugal impeller of a double-stage centrifugal compressor are installed at the same end of the motor rotor.

As shown in FIG. 1, the two centrifugal impellers are respectively positioned at hollows of the end parts of the first end shaft section 12 and the second end shaft section 13; in other words, the two centrifugal impellers are positioned at the two axial ends of the axial through hole 15; and the centrifugal impellers are positioned relative to a radial direction and an axial direction of the motor rotor 10 based on locating stops in the back surfaces of the centrifugal impellers.

The right section of the rod body of the locking rod 20 is provided with a shaft shoulder 211, and the movable protrusion part 23 is arranged between the shaft shoulder 211 and the end face of the axial lug boss 51 of the locating stop of the second-stage centrifugal impeller 50.

In some embodiments, the axial lug boss 51 of the locating stop of the second-stage centrifugal impeller 50 may be in clearance fit with the movable protrusion part 23, and the fitting clearance may be, for example, 0.01 mm to 0.02 mm. In this way, the movable protrusion part 23 can be effectively prevented from moving axially inside the second large-diameter section 153, and also the second-stage centrifugal impeller 50 can be prevented from being over-positioned in an assembling process.

When the axial lug boss 51 of the locating stop of the second-stage centrifugal impeller 50 is in small clearance fit with the movable protrusion part 23, the locking rod 20 may be axially positioned through the shaft shoulder 211.

According to the above description, it can be seen that the compressor rotor of the above embodiments of the present disclosure can effectively improve the connection strength of the rotor sections of the motor rotor with a plurality of rotor sections 10A, 10B, 10C, can also increase the critical speed of the rotor by reducing the length of a cantilever end, and further improves the work stability and reliability of a compressor with the compressor rotor and a motor of the compressor; the compressor can work at a high rotating speed and is simpler in structure; a system is more concise; and the compressor is smaller.

An embodiment of the present disclosure further provides a compressor including the compressor rotor of the above-mentioned embodiment. The compressor of the embodiments of the present disclosure and the compressor rotor of the embodiments of the present disclosure have the same advantages.

In some embodiments, the compressor may include a gas bearing, and the compressor rotor is supported on the gas bearing. The gas bearing may be a radial bearing or a thrust bearing. The gas bearing may be a dynamic-pressure gas bearing or a static-pressure gas bearing. In the compressor of the embodiments of the present disclosure, the compressor rotor thereof has relatively high work stability and reliability, and is suitable for being supported by a gas bearing. When a gas bearing is adopted, a compressed working medium can be used as suspension gas to avoid the use of a lubricating oil system and an oil separation system which are required when a rolling bearing or an oil film bearing is adopted. In this way, a fluid system where the compressor is arranged is not required, namely the complication degree and space usage of a refrigerant circulation system can be lowered.

An embodiment of the present disclosure further provides a refrigerant circulation system including the compressor of the above-mentioned embodiment. The refrigerant circulation system of the embodiments of the present disclosure and the above-mentioned compressor rotor of the embodiments of the present disclosure have the same advantages.

At last, it should be noted that: the above embodiments are merely intended to describe technical solutions of the present disclosure rather than limiting them; although the present disclosure is described in detail with reference to preferred embodiments, those of ordinary skill in the art should understand that: alteration of specific implementation of the present disclosure or equivalent substitution of some technical features can also be made and all should be included in the protection scope of the technical solutions of the present disclosure.

The invention claimed is:

1. A compressor rotor, comprising:
a motor rotor comprising a plurality of rotor sections fixedly connected in an axial direction, wherein the plurality of rotor sections are provided with an axial through hole;
a locking rod penetrating through the axial through hole;
a compression unit rotating part located on an end of the motor rotor and connected to the locking rod; and
a locking member configured to lock the compression unit rotating part on the locking rod, wherein the locking rod, the compression unit rotating part, and the locking member form a pressing structure which applies a pressure toward an axial inner side to the motor rotor;
wherein the axial through hole comprises a small-diameter section and two large-diameter sections which have a larger diameter than the small-diameter section;
the locking rod comprises a rod body in clearance fit with the small-diameter section and two protrusion parts arranged on the rod body and radially protruding outwards from the rod body, wherein the protrusion parts are fit with the large-diameter section;
an axial middle part of the motor rotor comprises a permanent magnet, the small-diameter section is located at an axial middle part of the axial through hole;
the two large-diameter sections are respectively located at a first end and a second end of the axial through hole;
at least one of the two protrusion parts is a movable protrusion part movable relative to the rod body;
the rod body is provided with a shaft shoulder, and the movable protrusion part is arranged between a surface of one end of the motor rotor and the shaft shoulder;
the compression unit rotating part at one end of the motor rotor where the movable protrusion part is arranged comprises an axial lug boss;

the axial lug boss extends into the axial through hole; and
the movable protrusion part is axially arranged between the shaft shoulder and an end face of the axial lug boss.

2. The compressor rotor according to claim 1, wherein the compression unit rotating part and the locking member are respectively arranged on a first end and a second end of the locking rod.

3. The compressor rotor according to claim 1, wherein
the end part of the locking rod is provided with an external thread; and
the locking member comprises a locknut engaged with the external thread.

4. The compressor rotor according to claim 1, wherein at least one of the two protrusion parts is a protruding ring.

5. The compressor rotor according to claim 1, wherein the movable protrusion part is engaged with an inner wall of the axial through hole through a key to limit the circumferential position of the movable protrusion part.

6. The compressor rotor according to claim 1, wherein a fitting clearance between the fixed protrusion part and the corresponding large-diameter section is smaller than a fitting clearance between the rod body and the small-diameter section.

7. The compressor rotor according to claim 1, wherein the movable protrusion part is in clearance fit with the rod body.

8. The compressor rotor according to claim 1, wherein the plurality of rotor sections comprise:
the permanent magnet;
a first end shaft section fixedly arranged at a first end of the permanent magnet; and
a second end shaft section fixedly arranged at a second end of the permanent magnet.

9. The compressor rotor according to claim 1, wherein the compression unit rotating part comprises a centrifugal impeller.

10. A compressor, comprising the compressor rotor according to claim 1.

11. The compressor according to claim 10, wherein the compressor comprises a gas bearing, and the compressor rotor is supported on the gas bearing.

12. A refrigerant circulation system, comprising the compressor according to claim 10.

\* \* \* \* \*

UNITED STATES PATENT AND TRADEMARK OFFICE
CERTIFICATE OF CORRECTION

PATENT NO. : 11,946,476 B2
APPLICATION NO. : 17/288210
DATED : April 2, 2024
INVENTOR(S) : Hua Liu et al.

It is certified that error appears in the above-identified patent and that said Letters Patent is hereby corrected as shown below:

In the Claims

Column 12, Line 16, Claim 11, after "compressor" insert -- rotor --

Signed and Sealed this
Twenty-first Day of May, 2024

Katherine Kelly Vidal
Director of the United States Patent and Trademark Office